United States Patent [19]

Schlanger

[11] 4,411,334

[45] * Oct. 25, 1983

[54] VEHICLE CONTROL SAFETY SYSTEM

[75] Inventor: Samuel L. Schlanger, Palm Springs, Calif.

[73] Assignees: Gail B. Mauer, Beverly Hills, Calif.; Ellen R. Cohen, Wayne, N.J. ; a part interest

[*] Notice: The portion of the term of this patent subsequent to Mar. 13, 1996, has been disclaimed.

[21] Appl. No.: 216,419

[22] Filed: Dec. 15, 1980

[51] Int. Cl.³ .................... B60R 1/18; B60R 21/00
[52] U.S. Cl. ................................ 180/274; 180/41; 180/232; 280/6 R; 280/6.1; 280/703; 280/777; 293/132; 296/35.2
[58] Field of Search ............... 180/274, 271, 272, 280, 180/281, 282, 232, 41, 141, 777; 280/689, 690, 692, 693, 694, 697, 703, 710, DIG. 1, 6 R-6 H, 6.1, 6.11; 296/35.2, 189; 188/300; 267/64.12; 293/103, 107, 111, 118, 129, 131-135

[56] References Cited

U.S. PATENT DOCUMENTS

| 3,065,976 | 11/1962 | Vogel | 280/DIG. 1 |
|---|---|---|---|
| 3,404,899 | 10/1968 | Vogel | 280/693 X |
| 3,547,466 | 12/1970 | Millican | 280/710 |
| 3,820,812 | 6/1974 | Stubb et al. | 280/710 X |
| 3,934,911 | 1/1976 | Oehlerking | 293/103 |
| 3,938,823 | 2/1976 | Hiruma | 280/703 |
| 3,945,664 | 3/1976 | Hiruma | 280/703 |
| 4,143,735 | 3/1979 | Schlanger | 180/274 |

Primary Examiner—Joseph F. Peters, Jr.
Assistant Examiner—Mitchell J. Hill
Attorney, Agent, or Firm—Allison C. Collard; Thomas M. Galgano

[57] ABSTRACT

A safety system for a vehicle having a chassis, including two parallel spaced-apart legs and an axle assembly for each of the wheels, includes a suspension assembly including an air piston arrestor pivotably coupled between the chassis and one of the axle assemblies, a device for arresting the air piston arrestor in a relatively rigid, non-compressible state, and an electromechanical device for activating the arresting device.

17 Claims, 13 Drawing Figures

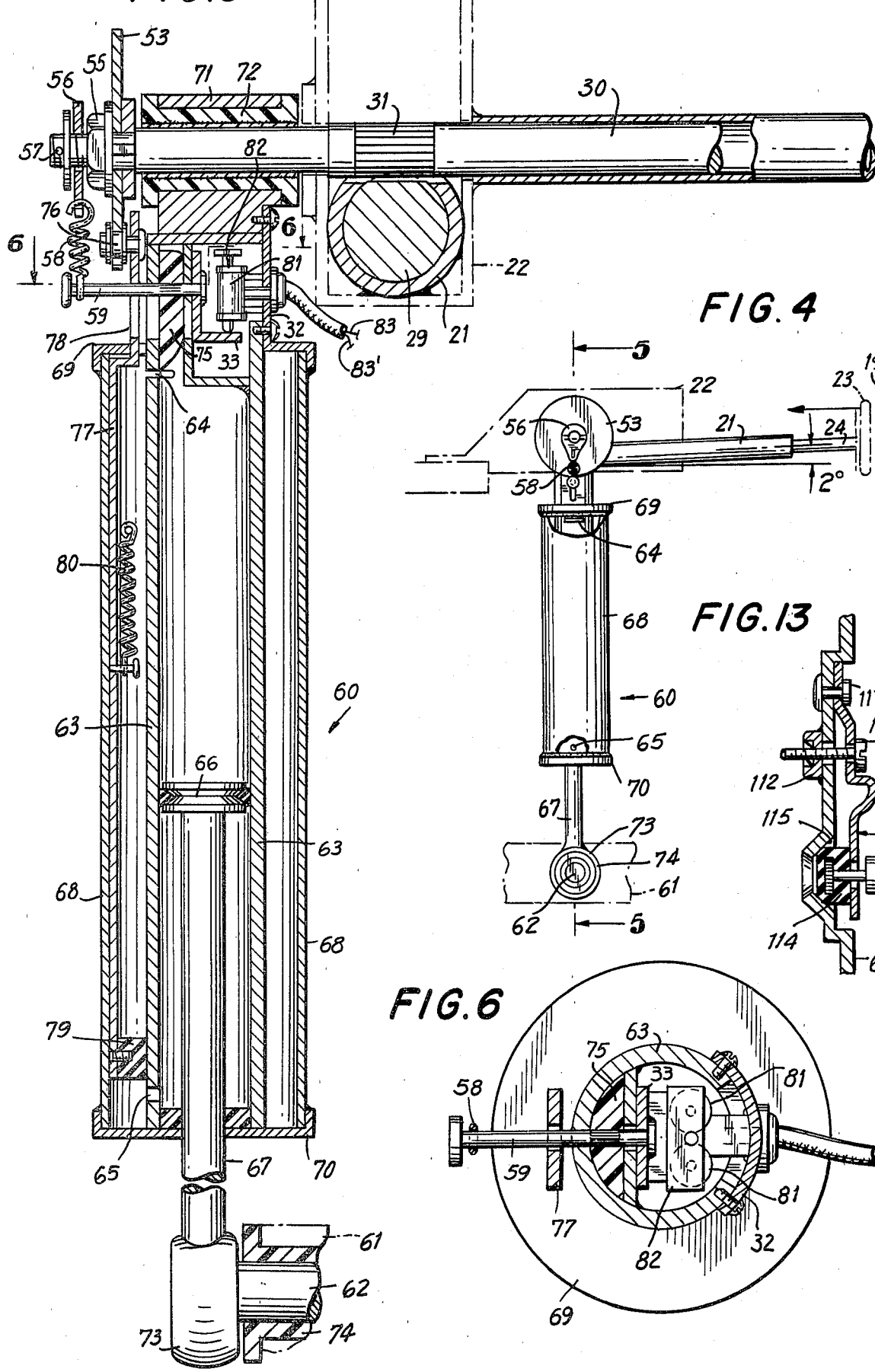

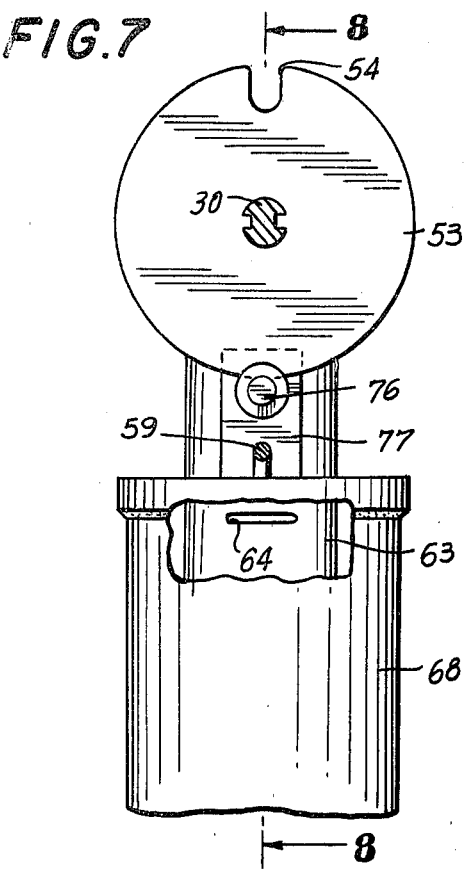
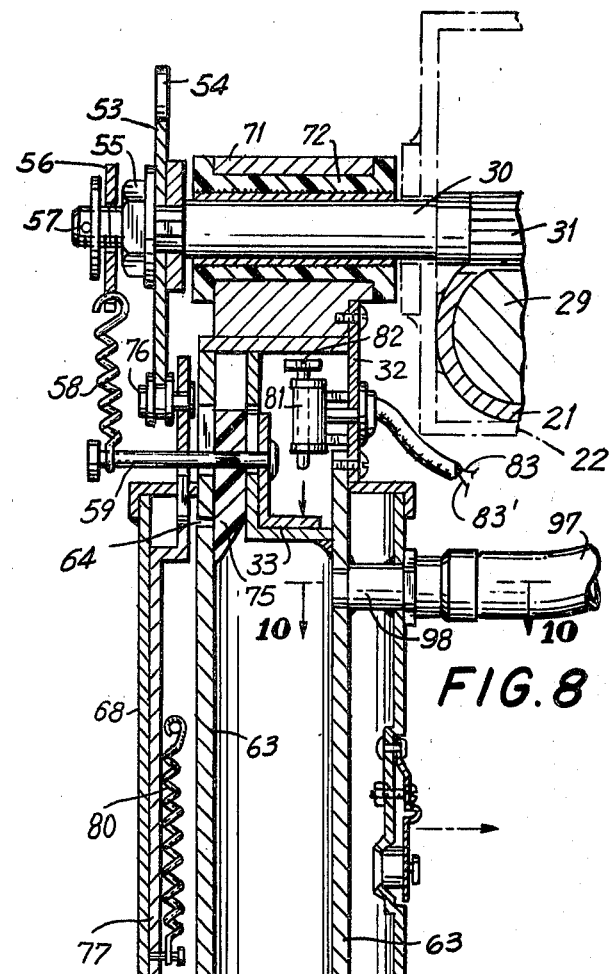
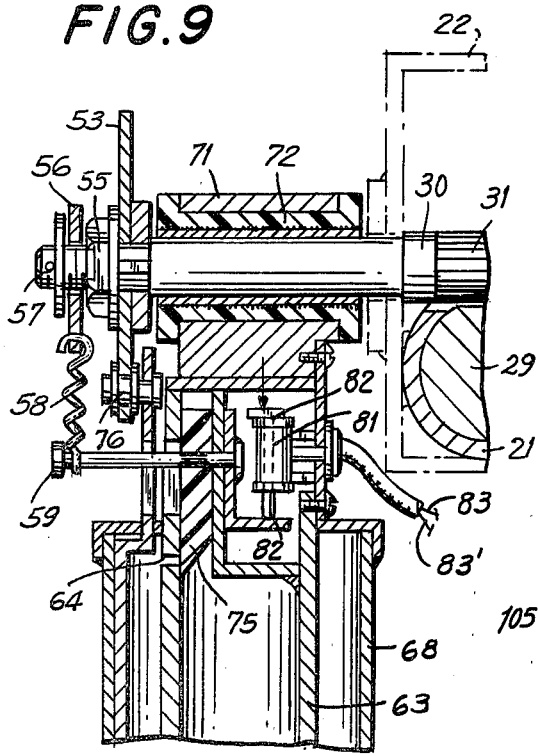
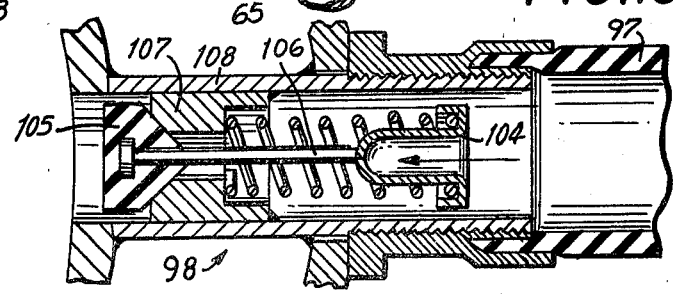

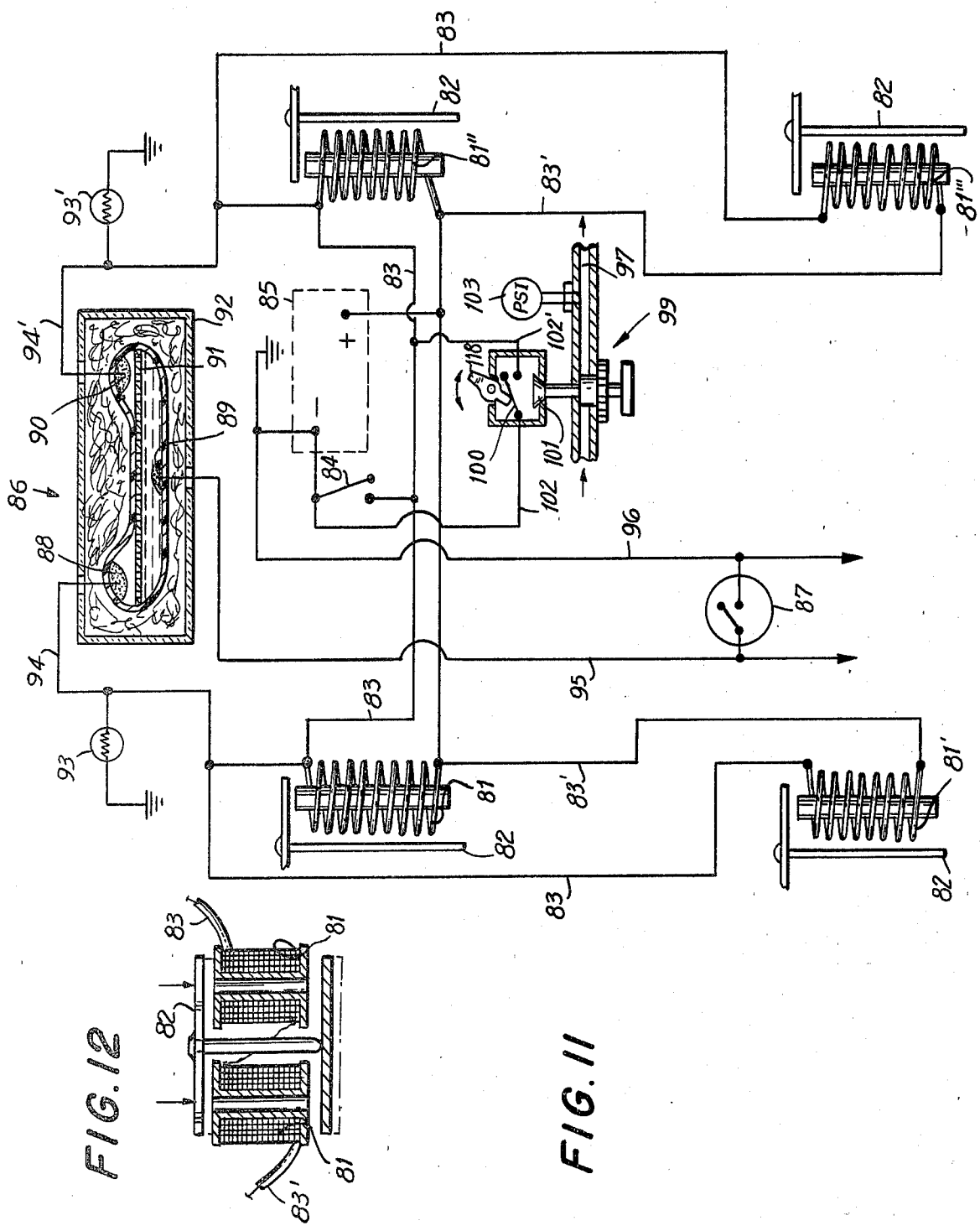

VEHICLE CONTROL SAFETY SYSTEM

This invention relates to a safety system for vehicles. More particularly, it relates to an anti-nose-dive, anti-sway and anti-rocking safety system for vehicles.

Today, there is an increased awareness of the need for safer vehicles and, in particular, those used as passenger cars, so as to reduce the incidence of passenger fatalities, and injuries resulting from front end and rear end collisions. This has led to the development of improved bumper systems which are designed to absorb the force of impact of a car traveling at speeds of up to 5 m.p.h., without damage to the car's body.

This has also led to the development of air-bags which, located only in the front seat compartment, are designed to inflate upon impact of a collision, to prevent the passengers from being thrown forward against the windshield of the car, typically as a result of the front end of the car dipping upon impact. Collapsible steering wheels and padded dashboards have also been incorporated into new car models to further reduce the risk of injury during a collision.

While safety devices of this type have been found acceptable when the vehicles are traveling at relatively slow speeds, there has been general concern about their effectiveness at normal cruising speeds. Moreover, while these safety devices serve to minimize the adverse effects of the car nose-diving upon impact, none serve to directly eliminate this serious problem. An anti-nose-dive system which dealt directly with this problem is disclosed in my prior U.S. Pat. No. 4,143,735. This patent discloses a system which, upon impact, arrests the front end suspension in a relatively rigid state and jacks up the front end of the car by means of a gear assembly, so as to prevent the car from nose-diving.

The present invention is an improvement of the anti-nose diving safety system disclosed in my aforesaid patent which eliminates the car-raising gear assembly while still serving to prevent front end nose-diving and which also affords both front and rear end protection and anti-sway and anti-rocking stabilization for the vehicle.

Accordingly, it is an object of the present invention to provide a novel safety system for vehicles which eliminates the problem of vehicle nose-diving upon collision, which provides greater vehicle and passenger protection in both front and rear end collisions, and which better controls the vehicle equilibrium.

It is also an object of the present invention to provide such a safety system which is effective at normal cruising speeds so as to minimize the possibility of passenger fatalities and injuries resulting from front end and head-on collisions.

It is a further object of the present invention to povide such a safety system which is relatively simple in design, economical to fabricate, durable, reliable in operation and which is readily adaptable for mass production on conventional vehicles.

It is still another object of the present invention to provide such a safety system which can raise the vehicle chassis and which would also eliminate the need for anti-sway bars while still minimizing car swaying.

It is also a particular object of the present invention and to provide a safety system with the foregoing attributes and characteristics which is provided with wheel damping "air piston arrestors" and which is especially suitable for small, light weight cars and which serves to improve road traction and decrease emergency braking distances.

Certain of the foregoing and related objects are readily attained in a safety system for a vehicle having a chassis, including two parallel spaced-apart legs and an axle assembly for each of the wheels, which includes a suspension assembly including an air piston arrestor pivotably coupled between the chassis and one of the axle assemblies, means for arresting the air piston arrestor in a relatively rigid, non-compressible state, and electromechanical means for activating the arresting means.

While the safety control system is primarily intended for automobiles, it is also ideal for railway trains. The air piston arrestors could be activated by mercury switch sensors to prevent swaying of the passenger cars for the smooth riding comfort of passengers. Such a system would provide improved safety for the railway tank cars, box cars, etc. by locking in a rigid manner the truck (undercarriage) spring suspension systems, when rounding curves of railroad tracks. The air piston arrestors, operated by compressed air or by the use of hydraulics, etc. and activated by the mercury switch sensor, as a result of their locking action, would place the weight and load of the cars directly onto the axle which prevents the train's wheels with its wheel flanges from jumping off the railroad track.

The mercury switch sensor may, of course, also be used in a car to arrest the air piston arrestors automatically on cornering and on curves in the road. In addition, to prevent car roll-over when the driver steps on the brake pedal while rounding sharp curves, in an emergency panic situation during highway cruising, a foot brake micro switch electrical system may be provided for activating the air piston arrestors as well.

With conventional vehicles, in frontal and rear end collisions, the chassis spring suspension systems collapse and then rebound, thereby producing a springboard effect, which throws the occupants against structural members of the car, causing the occupants to suffer fatal or critical bodily injury, as well as severe neck and back whiplash. The present safety system with the "air piston arrestors" controls this condition for the protection of the driver and passengers.

The pneumatic "air piston arrestors" can be made operational, as an alternative, by using in the cylinders hydraulic fluid, gases, etc., instead of air pressure.

The safety system may also include direct mechanical linkage for instant and automatic operation, upon frontal and/or rear end impacts, so as to maintain bumper height by the use of such locking or arresting devices designed to prevent the suspension systems from collapsing of both the aggressive and the struck vehicles, thereby avoiding the over-riding or under-riding of bumper bars and thereby greatly reducing major damage to autos in a collision. The safety system operates automatically, upon impact, before the actual crash occurs and is not under the driver's control.

The safety system can also be made operational electronically by using solid state components, if desired.

Other objects and features of the present invention will become apparent from the following detailed description when taken in connection with the accompanying drawings which disclose several embodiments of the invention. It is to be understood that the drawings are designed for the purpose of illustration only and are not intended as a definition of the limits of the invention.

In the drawings, wherein similar reference numerals denote similar elements throughout the several views:

FIG. 4 is a fragmentarily-illustrated side elevational view of the system's air piston arrestor coupled to the retractable bumper assembly;

FIG. 5 is a fragmentarily-illustrated cross-sectional view, in part elevation, taken along line 5—5 of FIG. 4;

FIG. 6 is a sectional view, in part elevation, taken along line 6—6 of FIG. 5;

FIG. 7 is an enlarged, fragmentarily-illustrated elevational end view of the upper portion of the air piston arrestor and the cam triggering assembly;

FIG. 8 is a fragmentarily-illustrated cross-sectional view, in part elevation, taken along line 8—8 of FIG. 7, further showing the provision of a compressed air line connection;

FIG. 9 is a fragmentarily-illustrated, sectional view of the upper portion of the air piston arrestor and cam and electro-magnetic twin coil triggering assemblies showing the coils activated to effect closing of the upper cylinder vent opening;

FIG. 10 is an enlarged, sectional view, in part elevation, taken along line 10—10 of FIG. 8;

FIG. 11 is an electrical schematic wiring system for activating the twin coils operatively coupled to the air piston arrestors for each of the wheels;

FIG. 12 is an enlarged side view of the electromagnetic twin coil units with a common plunger plate for actuating the air piston arrestor shutters; and FIG. 13 is an enlarged sectional view, in part elevation, of the air release valve for the air piston arrestors, shown in FIG. 8.

Figure 1:
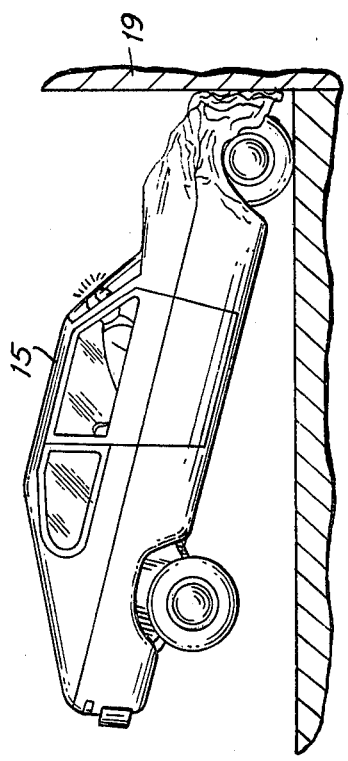
FIG. 1 is a side elevational view of car equipped with a conventional bumper and suspension system showing the front end of the car damaged and nose-diving downwardly after full impact with a wall, with the car's rear axle and wheels off the ground and also showing the driver's head striking the windshield.

Turning now in detail to the drawings, FIG. 1 illustrates a front end collision involving a conventionally equipped car 15 striking a barrier 19 wherein the front end of the car pitches downwardly or "nose dives" and propels the driver and passengers forwardly towards the front windshield. The remaining figures illustrate various aspects of a novel anti-nose-dive safety system for a vehicle embodying the present invention, which seek to eliminate this problem.

Figure 2:
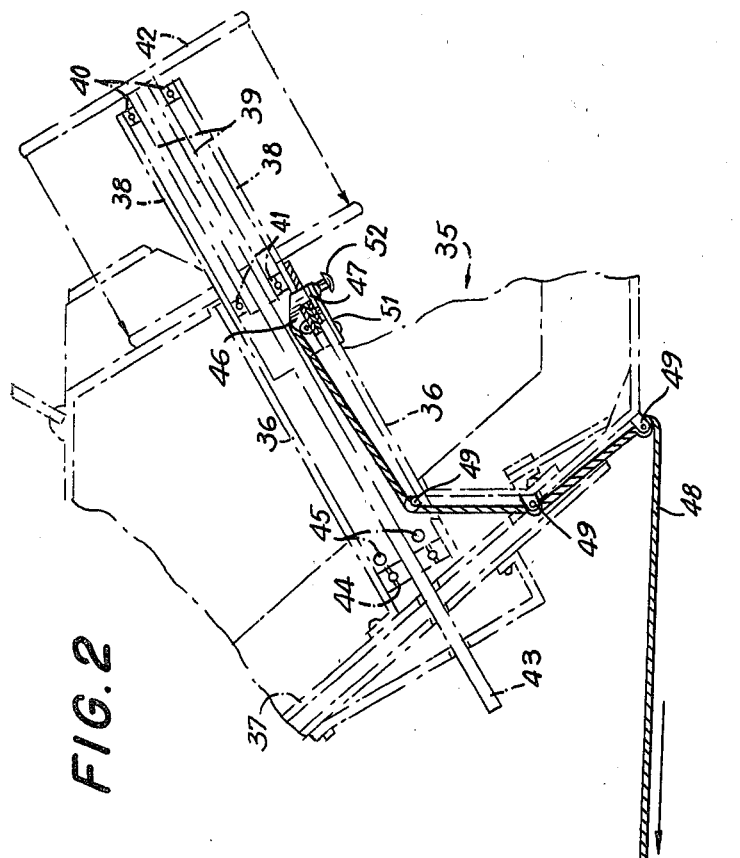
FIG. 2 is a fragmentarily-illustrated, longitudinal sectional view showing a collapsible steering column assembly mounted in the forward car compartment, shown in phantom line, and coupled to the safety system of the present invention by means of a cable for cooperation therewith.
Figure 3:
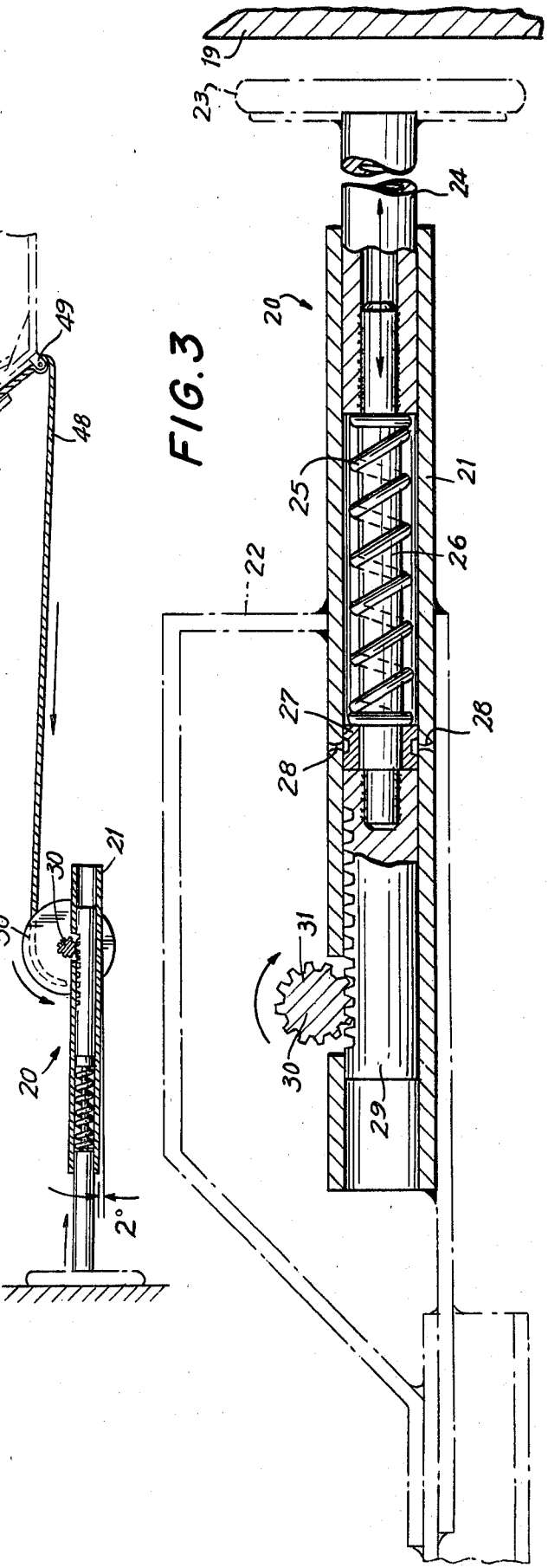
FIG. 3 is an enlarged, fragmentarily-illustrated sectional view of the retractable bumper assembly mounted on the car chassis, the latter of which is shown in phantom line.

The safety system includes essentially identical, retractable front and rear bumper assemblies, only the former of which is illustrated in the figures. More particularly, as can be seen in FIGS. 2 and 3, the system includes a generally horizontally-disposed retractable front bumper assembly 20 which is coupled to the forward portion of the chassis of a vehicle, at an upward and forward pitch of approximately 2°, so as to provide for a glancing blow, upon impact, in frontal collision; the chassis being illustrated through the various views in phantom line for the purpose of clarity. Front bumper assembly 20 includes a pair of parallel elongated, tubular bumper support arms 21 (only one of which is shown), each having a generally circular cross section, which are each welded to an opposite front chassis leg 22, extending forwardly therefrom.

Bumper assembly 20 also includes a retractable front bumper 23 having two elongated, spaced-apart, parallel, cylindrical bumper rods 24 secured to, and extending rearwardly from the inner surface thereof, (only one of which is shown), with each rod 24 being disposed adjacent to one of the outer ends of bumper 23. Rods 24 are each slidably and telescopically received in one of the support arms 21 for reciprocable movement therein, between a normal extended position and a retracted position; the latter position caused by impact of front bumper 23 with a relatively immovable barrier, such as a wall 19.

Front bumper 23 is equipped to absorb the force of an impact when the vehicle strikes a barrier while travelling at relatively slow speeds, e.g., up to 10 m.p.h., by means of coil springs 25 (only one of which is shown), each of which is mounted on a tubular connecting rod 26 and is disposed between a support collar 27, held in a fixed position by plug welds 28, and the inner end of one of the tubular rods 24, so as to urge rods 24 and bumper 23 in an outward direction. As can be appreciated, coil springs 25 will serve to dissipate the force of impact when front bumper strikes a barrier and is caused to retract.

The retractable bumper and coil spring assembly may be designed to withstand the force of impact of a car travelling at 10 m.p.h. without damage to the car or injury to its occupants. It should also be noted that other means, such as a hydraulic cylinder, may be employed to absorb the shock of the front bumper 23, upon impact.

For greater forces of impact, the plug welds 28 are designed to rupture or snap so as to allow for further retraction of the bumper rods 24 and, in turn, connecting rod 26 on which springs 25 are disposed. Connecting rods 26 each have an outer end which is welded to the inner end of rod 24 and an inner end which is welded to a ratchet or rack rod 29 which is also slidably and telescopically received in bumper support arm 21. Ratchet rod 29 has a toothed upper surface which is in meshing engagement with a fixed pinion or pinion surface 31 of a common front alignment shaft 39 rotatably supported on the chassis. As can be appreciated, the rear bumper assembly would be similar in construction to the front bumper assembly and would be coupled to a rear alignment shaft comparable to shaft 30.

As shown in FIG. 2, front bumper assembly 20 may be coupled to, and control, a retractable steering column assembly 35. Steering column assembly 35 includes a substantially cylindrical steering column housing support 36 bolted to the floor board 37 of the car. Telescopically and slidably received in housing support 36 is a steering column or shaft having an outer cylindrical tubular wall 38 and an inner tubular wall 39 having a square cross section which are coupled together by means of upper and lower bearing assemblies 40, 41. The top end of inner wall 39 supports a steering wheel 42 and a steering shaft 43 having a square cross section is telescopically and slidably received in its open bottom end; steering shaft 43 is rotatably supported in housing support 36 by a bearing assembly 44 and extends downwardly through the floor board 37. A pair of air vents 45 are provided in housing support 36.

Pivotably supported on the inner surface of outer wall 38, adjacent its lower end, is an L-shaped latch 46. Latch 46 has an end 47 which serves as a latch pin and is normally received in a bore formed in the support housing 36, adjacent its upper end so as to support the steering column in an extended position. The opposite end of latch 46 is secured to one end of a cable 48. Cable 48, guided by pulleys 49, extends downwardly through housing 36 and through the floor board 37 and is coupled at its other end to shaft 30 by a sheave 50, so that it may be wound thereon in response to retraction of bumper 23. Upon coiling of cable 48 on sheave 50 mounted on shaft 30, latch pin 47 will be released from housing support 36 to thus permit collapse and downwardly sliding of the steering column. A spring bar 51 is also mounted on support housing which has a knob 52 which supports a pin which serves to permit manual collapse of the steering column; the pin opposing the same bore as latch pin 47 so that by depressing knob 52, the pin is pushed in and releases latch pin 47.

The safety system also includes essentially identical modified front and rear end suspension assemblies. FIGS. 5-10 illustrate only the portion of the front end suspension system 60 associated with the front right wheel of the vehicle, but it is to be understood that the other suspension assemblies are essentially the same. Thus, front suspension assembly 60 is coupled between an end of the front alignment shaft 30 and one of the conventional front end axle assemblies 61 for each of the front wheels. Each suspension assembly includes a long stroke pneumatic piston arrestor which includes an inner cylindrical hollow jacket 63 having an air vent opening 64, closely adjacent to its top end, and an air vent opening 65, adjacent to its bottom end. A piston 66 attached to a piston rod 67 is slidably received in jacket 63 for generally vertical reciprocal movement therein. Jacket 63 is, in turn, received in an outer jacket 68 having welded-on upper and lower caps 69, 70. The space between the inner and outer jackets are preferably kept as small as possible.

A generally cylindrical collar 71 having a shock absorbing grommet with a freely-rotatable brass bushing lining 72 is secured to the upper end of jacket 63 protruding above cap 69, thereby pivotably supporting the air piston arrestor mounted on the end of shaft 30. Similarly, the lower end of piston rod 67 has a generally extended stud 73 having an annular-shaped grommet 74 which is pivotably mounted on an axle 62 of the front axle assembly 61.

Fixed to each of the ends of shaft 30, outwardly of brass bushing 72, is a cam 53 having a generally circular periphery except for a single inwardly curved, notched portion 54 (FIG. 7). A nut 55 is threadably received on each end of shaft 30, outwardly of cams 53. A freely rotatable annular disc 56 is also received on each end of shaft 30 outwardly of nuts 55 and is held thereon by means of a cotter pin 57 received through the threaded tip of each end of shaft 30. One end of a coil spring 58 is secured to disc 56 and its other end is secured to the outer end of a trigger bolt 59, the inner end of which is secured to a tapered, air vent cover plate or shutter 75 which is slidably supported on the inner surface of jacket 63 for movement between an open position (FIG. 5) and a closed position (FIGS. 8 and 9), relative to vent opening 64.

Movement thereof may be effected mechanically by a cam follower 76 which is disposed to ride on the periphery of cam 53 and which is coupled to an elongated, vertically disposed bar 77 having an elongated opening 78 through which trigger bolt 59 extends. Bar 77 is mounted in outer jacket 68 for vertical reciprocal movement between an upper open position (FIG. 5) and a lower closed position (FIG. 8), relative to vent opening 65; bar 77 being provided with a plastic plug or shutter 79 at its lower end to close vent opening 65, when in the latter position. Bar 77 is normally retained in its upper position by the biasing force of coil spring 80, the lower end of which is attached to bar 77 and the upper end of which is attached to outer jacket 68.

When cam 53 is in its normal position, cam follower 76 is held in biased engagement and received, under the force of coil spring 58, within notched portion 54 of cam 53 and it, in turn, will hold shutters 75 and 79, in an open position, relative to vent openings 64 and 65, respectively. In this position, the air piston arrestor will function as a non-vibrational chassis suspension damping device. However, upon frontal impact, in a collision, when cam 53 is rotated, cam follower 76 will be forced out of the notched portion 54 and will, in turn, push bar 77 and, in turn, bolt 59 and shutters 75 and 79 downwardly (FIG. 8), causing them to close vent openings 64 and 65, respectively. As a result, any movement of piston 66 and rod 67 in jacket 63 will be arrested in a substantially rigid, non-compressible state, thereby locking the front bumper height. The same will, of course, hold true for the rear suspension system and the rear bumper during a rear end collision.

The present invention advantageously provides for an alternate manner of actuation of the air piston arrestors. As shown in FIGS. 5 and 6, mounted in the top end of inner jacket 63 behind a removable plate 32 are a pair of electro-magnetic coils 81 having a reciprocably-movable common plunger 82 and common wire leads 83, 83' (see FIG. 12). Plunger 82 is directed downwardly and is disposed to engage the bottom arm of an L-shaped plunger bar 33, the upper arm of which is connected to trigger bolt 59. Consequently, upon activation of coils 81, the central cores thereof will become magnetized and will attract plunger 82 thereto. The depending rod of plunger 82 will then push plunger bar 33 downwardly and this, in turn, will cause trigger bolt 59 to drop, thereby effecting closing of vent opening 64, except as previously effected mechanically due to the retraction of the front and/or rear bumper assemblies.

As shown in FIG. 11, the wire leads 83, 83', for each of the twin coils 81 and 81', 81" and 81'", associated with the air piston arrestors for the left side front and rear tires and the right side front and rear tires, respectively, are coupled in parallel and are connected to a microswitch 84 situated, e.g., at the brake pedal for braking and emergency stopping situations which, in turn, is hooked up to the car's battery-generator system 85. Thus, upon stepping on the brake pedal, microswitch 84 will be closed and will, in turn, activate the coils 81 and 81', 81" and 81'", thereby locking the front and rear suspensions in a rigid manner via the air piston arrestors, throwing the full weight of the upper chassis and load, including the motor, etc., directly on all tires held rigid against the road surface, for better traction in all kinds of weather conditions.

A mercury tilt and sway sensor contact switch 86 is connected to and activated by the vehicle's starter switch 87 to feed the electrical circuits which is, of course, coupled to the battery system via wire leads 95 and 96, the arrows indicating the leads to the motor starter electrical system. Mercury switch 86 is used to control current flow to either the left or right side magnetic coils. If the car pitches downwardly to an undesirable extent to the left, the mercury will bridge the left contact 88 and center contact 89, activating the warning signal 93 and energizing the left side coils 81 and 81' via wire lead 94 to prevent the car from pitching to the left. If, on the other hand, the car pitches downwardly to the right, just the opposite takes place with the mercury electrically bridging the center contact 89 and right contact 90 and the right side coils 81'' and 81''' and signal light 93' will be activated via wire lead 94'. Thus, by the use of this mercury switch 86, an automatic tilt control, wind and load anti-sway unit is provided which eliminates the need for conventional anti-sway bars.

The mercury sensor switch 86 is preferably mounted in an insulated casing 92 containing an insulation filler, such as glass wool, asbestos, etc., to protect it against hot and cold temperatures, and is positioned in the roof at the rear uppermost part of the vehicle. It may preferably include a perforated screen or grid 91 to control undesirable sloshing or splashing of the mercury.

As shown in FIG. 8, a compressed air line 97 may be connected to the interior of inner jacket 63 of the air piston arrestors by an air valve 98 (FIG. 10). Hose 97 would be connected to a compressed air source (not shown) located on the vehicle via a manually controlled air regulator valve 99, preferably located on the dashboard, which also pneumatically actuates an electrical switch 100 via a conventional diaphragm or bellows pressure device 101 which is also fed compressed air upon opening of valve 99. As shown in FIG. 11, switch 100 bypasses switch 84 and is connected to wire leads 83, 83' via wire leads 102, 102', respectively, so as to serve as an alternate means of activating the air piston arrestors. Switch 100 may also be closed by toggle switch 118 for manual operation during bad weather road conditions to put dead weight on all wheels of the vehicle by locking rigid the suspension systems.

At the same time, air would be fed via compressed air line 97 in the direction of the arrows shown in FIG. 11, to air feed valve 98; a pressure gauge 103 may be connected to line 97 to monitor the air pressure, this gauge would also be conveniently located on the dashboard with the other car gauges. The force of the compressed air would cause the spring-loaded brass air thimble 104 to move in the direction of the arrow (FIG. 10), thereby causing the rubber valve head or stopper 105 at the opposite end of shaft 106 to move off the valve seat defined on the bored cylindrical fixed plug 107 mounted in valve housing 108 and to allow the compressed air to enter inner jacket 63 above piston 66 and enhance the rigidity of the air piston arrestors; depending on the pressure supplied, this may also be used to raise chassis 22 by causing further extension of piston rod 67 or to allow for greater loads to be placed thereon.

As shown in FIG. 8 and in greater detail in FIG. 13, the air piston arrestors each include an air release valve 110 for venting the pressurized air within the outer jacket 68 and, in turn, inner jacket 63. Valve 110 includes a generally flat tension spring 111 secured at one end by a rivet 117 to outer jacket 68. Spring 111 is held thereagainst in an adjustable manner by means of a lock nut 112 fixed to the inner wall of jacket 68 and an adjustment screw 113 extending through aligned bores provided in jacket 68 and spring 111. The other end of spring 111 has a round rubber bumper or plug 114 loosely secured thereto by means of rivet 116 which is disposed for mating biasing receipt with an inwardly tapered, frustoconical valve seat 115 recessed in the wall of jacket 68; the loose mounting of plug 114 serves to ensure that plug 114 will always mate properly with valve seat 115 regardless of the adjusted spring pressure.

As can be readily appreciated, release of plug 114 from valve seat 115 and the venting of the opening thereof defined by valve seat 115 will be automatically effected if the inside cylinder pressure is greater than the spring pressure, the latter of which may be adjusted by adjustment screw 113. The spring tension will be set by the installer so as to effect the release of air from within inner jacket 63, after manual pressurization of the air piston arrestors be means of valve 99, automatically to the lower operating air pressure, for normal cruising of the vehicle. This occurs upon deactivation of manual toggle switch 118 which causes shutter 75 to retract, thereby allowing the venting of inner chamber through vent 64 and, in turn, valve 110.

Turning now to the overall operation, under normal driving conditions, the safety system is effectively inoperative with bumper 23 in an extended position, and shutters 75, 79 in an open position relative to vent openings 64, 65, so that the air piston arrestors operate only as a chassis damping device under normal cruising conditions. However, when bumper 23 strikes a wall 19 or another relatively immovable object, bumper rods 24 will retract within bumper arms 21, causing shaft 30 to rotate. Rotation of shaft 30 will also cause rotation of cams 53 which, through cam followers 76, will move shutters 75, 79 to a closing position relative to vent openings 64, 65. Consequently, the air piston arrestors will be arrested in a relatively non-compression state to eliminate nose-diving of the car.

Where the safety system is also coupled to the collapsible steering assembly 35, as a result of rotation of shaft 30, cable 48 will be wound up thereon which, in turn, will cause release of latch 46. This, in turn, will cause instant collapse of the steering column.

Furthermore, in an emergency braking situation, microswitch 84 will be activated as previously described to effect locking of the air piston arrestors and, as the car is driven, mercury switch 86 will automatically serve to maintain the car's equilibrium. Finally, the safety system may be manually activated by valve 99 which also feeds compressed air to the heads of the cylinders so as to allow for greater loads or to raise the chassis and passenger compartment in the case of floods, high snow drifts, etc.

It should, of course, be appreciated that various modifications may be made as will be apparent to those skilled in the art. For example, although it is preferable to use electromagnetic coils for triggering the shutters of the air piston arrestors, other electromechanical means, such as solenoids or electro-pneumatic devices, could be used. In addition, other wiring arrangements for the various alternate activation systems may be possible. Further, the diameter of the cylinder piston heads will normally be determined by the vehicles upper weight and load.

Thus, while only several embodiments of the present invention have been shown and described, it will be obvious that many changes and modifications may be made thereunto, without departing from the spirit and scope of the invention.

What is claimed is:

1. A safety system for a vehicle having a chassis, including two parallel spaced-apart legs and an axle assembly for each of the wheels, comprising:
   a suspension assembly including at least one air piston arrestor pivotably coupled between said chassis and one of said axle assemblies, including an inner cylindrical jacket having an upper and lower vent opening and a piston rod having a piston secured thereto at one end thereof which is slidably received in said jacket;
   means for arresting said air piston arrestor in a relatively rigid, non-compressible state, including a pair of shutters, each of which is movable between an open and closed position relative to one of said vent openings
   means for moving said shutters; and
   electromechanical means for activating said arresting means.

2. The system according to claim 1, wherein said electromechanical means comprises at least one electromagnetic coil and a reciprocably movable plunger associated therewith which, upon activation of said coil, is movable from a non-activating to an activating position relative to said means for moving said shutters.

3. The system according to claim 1, additionally including means for introducing compressed air into said inner cylindrical jacket which includes valve means which concurrently triggers said electromechanical means.

4. The system according to claim 1 or 3, wherein said system includes an air piston arrestor for each of said axle assemblies and separate electromechanical means for each of said air piston arrestors, wherein the electromechanical means associated with the left front and rear wheel air piston arrestors and the electromechanical means associated with the right front and rear wheel air piston arrestors are coupled in parallel to a left contact and a right contact of a three-contact mercury switch, tilt and sway capsule device, respectively, which device has a central contact which may be coupled to the vehicle starter switch.

5. The system according to claim 4, additionally including a manually-operated toggle switch for triggering said electromechanical means.

6. The system according to claim 5, additionally including four outer cylinders in each of which one of said inner cylinders is received and an air release valve mounted on each of said outer cylinders for automatically venting the pressurized air therewithin and, in turn, the inner jacket under deactivation of said toggle switch.

7. The system according to claim 4, wherein said electromechanical means associated with the left front and rear wheel air piston arrestors and the electromechanical means associated with the right front and rear wheel air piston arrestors are coupled in parallel and are connected to a microswitch which is disposed adjacent to a brake pedal of the vehicle and is connected to a battery-generator system.

8. A safety system for a vehicle having a chassis, including two parallel spaced-apart legs and an axle assembly for each of the wheels, comprising:
   a suspension assembly including at least one air piston arrestor pivotably coupled between said chassis and one of said axle assemblies;
   means for arresting said air piston arrestor in a relatively rigid, non-compressible state;
   electromechanical means for activating said arresting means; and
   at least one bumper assembly including a short stroke retractable bumper slidably mounted on said chassis for movement between a normal, extended position and a retracted position, said bumper assembly includes two generally parallel, spaced-apart hollow support arms, each of which is mountable on one of said chassis legs at one end thereof, and wherein said bumper includes two generally parallel, spaced-apart rods, each of which is telescopically received in one of said hollow support arms.

9. The system according to claim 8, additionally including means for retaining said rods in said support arms in a biased manner.

10. The system according to claim 9, wherein said means for retaining comprises a collar releasably mounted in each of said support arms and a coil spring disposed between each of said collars and the associated bumper rod received in said support arm.

11. The system according to claim 8, wherein said rods of said bumper are connected to a ratchet rod having a toothed upper surface, wherein said chassis includes a rotatable main shaft mounted thereon which has a pinion surface in mesh with the toothed upper surface of each of the ratchet rods.

12. The system according to claim 11, wherein each of said air piston arrestors includes an inner cylindrical jacket having an upper end which is pivotably coupled to said main shaft, said jackets having a vent opening adjacent to its upper and lower end, and a piston rod having a piston secured thereto at one end thereof which is slidably received in said jacket, said piston rod being pivotably coupled at its other end to one of said axle assemblies.

13. The system according to claim 12, wherein said means for arresting said air piston arrestor includes a pair of shutters, each of which is movable between an open and closed position relative to one of said vent openings and means for moving said shutters.

14. The system according to claim 13, wherein said means for moving includes a pair of cams fixed on said main shaft, adjacent opposite ends thereof, and a pair of cam followers, each of which is coupled to one of said shutters and each of which is disposed to ride on the periphery of one of said cams, said cams each having a substantially circular periphery and an inwardly notched portion formed in said circular periphery thereof, said cam followers when received in said notched portions maintaining said shutters in an open position and when received on the circular periphery of said cams maintaining said shutters in said closed position.

15. The system according to claim 14, wherein said cam followers are each spring-loaded by means of a coil spring.

16. The system according to claim 11, additionally including a retractable steering wheel column assembly comprising a steering column housing, and a steering column slidably received in said steering column housing and movable between an extended and retracted position, and means for moving said steering column from said extended to said retracted position in respond to movement of said bumper from said normal position to said retracted position thereof.

17. The system according to claim 16, wherein said means for moving said steering shaft includes a pivotable latch mounted on said steering column having a latch pin which releasably engages with said column housing to maintain said shaft in an extended position, and a cable, one end of which is secured to said latch and the other of which is secured to said main shaft, for winding thereon, said cable being wound upon said shaft upon rotation thereof and, in turn, releasing engagement of said latch pin with said steering column housing to permit retraction and collapse of the steering wheel.

* * * * *